US012803111B2

(12) United States Patent
Kim et al.

(10) Patent No.: US 12,803,111 B2
(45) Date of Patent: Nov. 17, 2026

(54) BATTERY MODULE AND BATTERY PACK INCLUDING THE SAME

(71) Applicant: LG ENERGY SOLUTION, LTD., Seoul (KR)

(72) Inventors: Kwangmo Kim, Daejeon (KR); Junyeob Seong, Daejeon (KR); Hyemi Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 734 days.

(21) Appl. No.: 18/024,950

(22) PCT Filed: Jan. 6, 2022

(86) PCT No.: PCT/KR2022/000253

§ 371 (c)(1),
(2) Date: Mar. 6, 2023

(87) PCT Pub. No.: WO2022/154374

PCT Pub. Date: Jul. 21, 2022

(65) Prior Publication Data

US 2024/0030549 A1 Jan. 25, 2024

(30) Foreign Application Priority Data

Jan. 15, 2021 (KR) ........................ 10-2021-0005832

(51) Int. Cl.

*H01M 50/30* (2021.01)
*H01M 50/224* (2021.01)

(Continued)

(52) U.S. Cl.

CPC ....... *H01M 50/394* (2021.01); *H01M 50/224* (2021.01); *H01M 50/383* (2021.01); *H01M 50/505* (2021.01)

(58) Field of Classification Search

CPC ........... H01M 50/116; H01M 10/6564; H01M 10/0422

See application file for complete search history.

(56) References Cited

U.S. PATENT DOCUMENTS 4,859,546 A * 8/1989 Binder ................ H01M 50/383 429/57
6,498,406 B1 12/2002 Høriuchi et al.

(Continued)

FOREIGN PATENT DOCUMENTS

CN 105531846 A 4/2016
EP 3 876 303 A1 9/2021

(Continued)

OTHER PUBLICATIONS

International Search Report for PCT/KR2022/000253 (PCT/ISA/210) mailed on May 3, 2022.

(Continued)

*Primary Examiner* — Olatunji A Godo

(74) *Attorney, Agent, or Firm* — Birch, Stewart, Kolasch & Birch, LLP

(57) ABSTRACT

A battery module includes a battery cell stack in which a plurality of battery cells are stacked and a module frame for housing the battery cell stack. A venting part is formed on at least one surface of the module frame, the venting part includes a plurality of stacked layers, and micropores are formed in each of the plurality of layers.

15 Claims, 18 Drawing Sheets

(51) Int. Cl.
*H01M 50/383* (2021.01)
*H01M 50/505* (2021.01)

(56) References Cited

U.S. PATENT DOCUMENTS

| | | | | |
|---|---|---|---|---|
| 2006/0068273 | A1 | 3/2006 | Yoo | |
| 2009/0197153 | A1 | 8/2009 | Fujikawa et al. | |
| 2015/0147605 | A1* | 5/2015 | Kim | H01M 50/394 429/53 |
| 2017/0018748 | A1* | 1/2017 | Matsuura | H01M 50/317 |
| 2018/0026245 | A1 | 1/2018 | Page et al. | |
| 2018/0269448 | A1* | 9/2018 | Shimizu | H01M 50/342 |
| 2019/0097203 | A1 | 3/2019 | Kwag et al. | |
| 2020/0112009 | A1 | 4/2020 | Riley et al. | |
| 2020/0136111 | A1 | 4/2020 | Jiang et al. | |
| 2020/0152942 | A1 | 5/2020 | Page et al. | |
| 2020/0328389 | A1 | 10/2020 | Lloyd | |
| 2021/0164511 | A1 | 6/2021 | Jeong et al. | |
| 2021/0313664 | A1 | 10/2021 | Park et al. | |
| 2021/0320374 | A1 | 10/2021 | Lee et al. | |
| 2022/0021060 | A1 | 1/2022 | Yoo et al. | |

FOREIGN PATENT DOCUMENTS

| | | | |
|---|---|---|---|
| JP | 3047486 | U | 4/1998 |
| JP | 3625683 | B2 | 3/2005 |
| JP | 2009-212081 | A | 9/2009 |
| JP | 2014-160573 | A | 9/2014 |
| JP | 6390062 | B2 | 9/2018 |
| JP | 2019-169454 | A | 10/2019 |
| KR | 10-2007-0035195 | A | 3/2007 |
| KR | 10-0788540 | B1 | 12/2007 |
| KR | 10-2016-0123852 | A | 10/2016 |
| KR | 10-2017-0014309 | A | 2/2017 |
| KR | 10-2017-0137997 | A | 12/2017 |
| KR | 10-2019-0022830 | A | 3/2019 |
| KR | 10-2019-0035580 | A | 4/2019 |
| KR | 10-2072098 | B1 | 1/2020 |
| KR | 10-2020-0107213 | A | 9/2020 |
| KR | 10-2020-0111525 | A | 9/2020 |
| KR | 10-2020-0142242 | A | 12/2020 |
| WO | WO 2018/043889 | A1 | 3/2018 |
| WO | WO 2020/138821 | A1 | 7/2020 |
| WO | WO 2020/179994 | A1 | 9/2020 |
| WO | WO 2020/256304 | A1 | 12/2020 |

OTHER PUBLICATIONS

Extended European Search Report for European Application No. 22739572.0, dated Aug. 19, 2024.

* cited by examiner

Conventional Art

Conventional Art

Conventional Art

BATTERY MODULE AND BATTERY PACK INCLUDING THE SAME

CROSS CITATION WITH RELATED APPLICATION(S)

This application claims the benefit of Korean Patent Application No. 10-2021-0005832 filed on Jan. 15, 2021 with the Korean Intellectual Property Office, the content of which is incorporated herein by reference in its entirety.

TECHNICAL FIELD

The present disclosure relates to a battery module and a battery pack including the same, and more particularly, to a battery module having enhanced safety and a battery pack including the same.

BACKGROUND

In modern society, as portable devices such as a mobile phone, a notebook computer, a camcorder and a digital camera has been daily used, the development of technologies in the fields related to mobile devices as described above has been activated. In addition, chargeable/dischargeable secondary batteries are used as a power source for an electric vehicle (EV), a hybrid electric vehicle (HEV), a plug-in hybrid electric vehicle (P-HEV) and the like, in an attempt to solve air pollution and the like caused by existing gasoline vehicles using fossil fuel. Therefore, the demand for development of the secondary battery is growing.

Currently commercialized secondary batteries include a nickel cadmium battery, a nickel hydrogen battery, a nickel zinc battery, and a lithium secondary battery. Among them, the lithium secondary battery has come into the spotlight because they have advantages, for example, hardly exhibiting memory effects compared to nickel-based secondary batteries and thus being freely charged and discharged, and having very low self-discharge rate and high energy density.

Such lithium secondary battery mainly uses a lithium-based oxide and a carbonaceous material as a cathode active material and an anode active material, respectively. The lithium secondary battery includes an electrode assembly in which a cathode plate and an anode plate, each being coated with the cathode active material and the anode active material, are arranged with a separator being interposed between them, and a battery case which seals and houses the electrode assembly together with an electrolytic solution.

Generally, the lithium secondary battery may be classified based on the shape of the exterior material into a can-type secondary battery in which the electrode assembly is mounted in a metal can, and a pouch-type secondary battery in which the electrode assembly is mounted in a pouch of an aluminum laminate sheet.

In the case of a secondary battery used for small-sized devices, two to three battery cells are arranged, but in the case of a secondary battery used for a middle- or large-sized device such as an automobile, a battery module in which a large number of battery cells are electrically connected is used. In such a battery module, a large number of battery cells are connected to each other in series or parallel to form a cell assembly, thereby improving capacity and output. One or more battery modules can be mounted together with various control and protection systems such as a BDU (battery disconnect unit), a BMS (battery management system) and a cooling system to form a battery pack.

FIG. 1 is a perspective view showing a conventional battery module.

Referring to FIG. 1, the conventional battery module 10 can be manufactured by housing a battery cell stack (not shown) in the module frame 20 and then joining the end plate 40 to the opened portion of the module frame 20. At this time, a terminal busbar opening 41H where a part of the terminal busbar is exposed and a module connector opening 42H where a part of the module connector is exposed can be formed in the end plate 40. The terminal busbar opening 41H is for guiding the high voltage (HV) connection of the battery module 10, and the terminal busbar exposed through the terminal busbar opening 41H can be connected to another battery module or a BDU (battery disconnect unit). The module connector opening 42H is for guiding the LV (Low voltage) connection of the battery module 10, and the module connector exposed through the module connector opening 42H is connected to a BMS (battery management system) and can transmit voltage information, temperature information, or the like of the battery cell.

FIG. 2 is a view showing a state when the battery module ignites in the conventional battery pack in which the battery module of FIG. 1 is mounted. FIG. 3 is a cross-sectional view taken along the cutting line I-I' of FIG. 2, which is a cross-sectional view showing the appearance of a flame that affects adjacent battery modules when a conventional battery module ignites.

Referring to FIGS. 1 to 3, the conventional battery module 10 includes a battery cell stack in which a plurality of battery cells 11 are stacked, a module frame 20 that houses the battery cell stack, and end plates 40 that are formed on the front and rear surfaces of the battery cell stack.

When physical, thermal or electrical damage including overcharging occurs to the battery cell, the internal pressure of the battery cell 11 increases and exceeds a limit value of the fusion strength of the battery cell 11. In this case, the high-temperature heat, gas, and flame generated in the battery cell 11 can be discharged to the outside of the battery cell 11.

At this time, the high-temperature heat, gas and flame may be discharged through the openings 41H and 42H formed in the end plate 40. However, in the battery pack structure in which a plurality of battery modules 10 are arranged so that the end plates 40 face each other, the high-temperature heat, gas and flame ejected from the battery module 10 may affect the adjacent battery module 10. Thereby, the terminal busbar or the like formed on the end plate 40 of the adjacent battery module may be damaged, and high-temperature heat, gas and flame may enter the interior of the battery module 10 via the openings formed in the adjacent end plates 40 of the battery module 10 to damage other electrical components including the plurality of battery cells 11. In addition, this leads to heat propagation of the adjacent battery modules 10, which cause a chain ignition in the battery pack.

Therefore, there is a need to develop a technology capable of controlling high-temperature flames so that the influence on the adjacent battery module can be minimized when thermal propagation occurs in the battery module.

DETAILED DESCRIPTION OF THE INVENTION

Technical Problem

It is an object of the present disclosure to provide a battery module capable of controlling the discharge of a flame when an ignition phenomenon occurs in the battery module, and a battery pack including the same.

However, the problem to be solved by embodiments of the present disclosure is not limited to the above-described problems, and can be variously expanded within the scope of the technical idea included in the present disclosure.

Technical Solution

According to one aspect of the present disclosure, there is provided a battery module comprising: a battery cell stack in which a plurality of battery cells are stacked; and a module frame for housing the battery cell stack, wherein a vent is formed on at least one surface of the module frame, wherein the vent comprises a plurality of stacked layers, and wherein micropores are formed in each of the plurality of layers.

The plurality of layers may include a first layer and a second layer stacked in a first direction. The micropores formed in the first layer and the micropores formed in the second layer may be offset from each other in a second direction.

The plurality of layers may include a first layer and a second layer. A size of the micropores formed in the first layer and a size of the micropores formed in the second layer may be different from each other.

A diameter of the micropores formed in the first layer may be different from a diameter of the micropores formed in the second layer.

The plurality of layers may include a first layer and a second layer. The micropores formed in the first layer and the micropores formed in the second layer may be different from each other. The plurality of layers may include a first layer and a second layer. A density of the micropores formed in the first layer may be different than a density of the micropores formed in the second layer.

The plurality of layers may include a first layer and a second layer. A micropore group in which the micropores are gathered may be formed in each of the first layer and the second layer, and an arrangement form formed by the micropore group of the first layer may be different from an arrangement form formed by the micropore group of the second layer.

The plurality of layers may be metal sheets.

The plurality of layers may be press-fitted at high temperature and high pressure to form the vent.

The module frame may include a ceiling, a bottom and side surface covering an upper surface, a lower surface and side surfaces of the battery cell stack, respectively. At least one of the ceiling, the bottom and the side surfaces may include the vent.

The battery module may further include a first end plate and a second end plate that cover a front surface and a rear surface of the battery cell stack, respectively. At least one of a terminal busbar opening through which a terminal busbar is exposed and a module connector opening through which a module connector is exposed may be formed in at least one of the first end plate and the second end plate.

The plurality of layers may be arranged apart from each other at a predetermined interval.

The module frame may include an upper frame and a lower frame, and the upper frame and the lower frame may be joined by a method in which edges corresponding to each other are welded.

The plurality of layers mat be a first layer and a second layer. The micropores formed in the first layer may have a different shape than the micropores formed in the second layer.

The plurality of layers may be a first layer and a second layer. The micropores formed in the first layer may be formed in a first pattern and the micropores formed in the second layer may be formed in a second pattern different than the first pattern.

Advantageous Effects

According to embodiments of the present disclosure, a plurality of layers in which micropores are formed are configured in a venting structure, and when an ignition phenomenon occurs in the battery module, the high-temperature gas can be quickly discharged to the outside, and the high-temperature flame can be suppressed. Thereby, it is possible to prevent a flame from being applied to the battery module that is adjacent to the battery module in which the ignition phenomenon has occurred, thereby minimizing the damage.

The effects of the present disclosure are not limited to the effects mentioned above and additional other effects not described above will be clearly understood from the description of the appended claims by those skilled in the art.

DETAILED DESCRIPTION OF THE EMBODIMENTS

Figure 1:
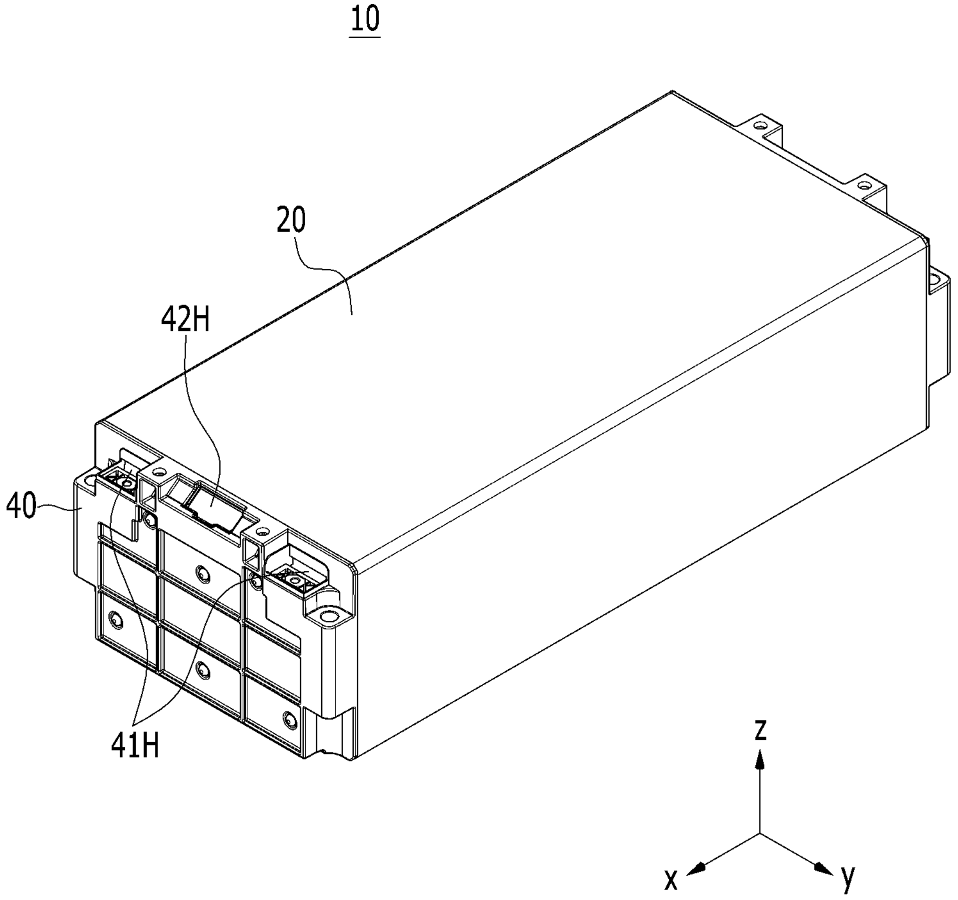
FIG. 1 is a perspective view showing a conventional battery module.
Figure 2:
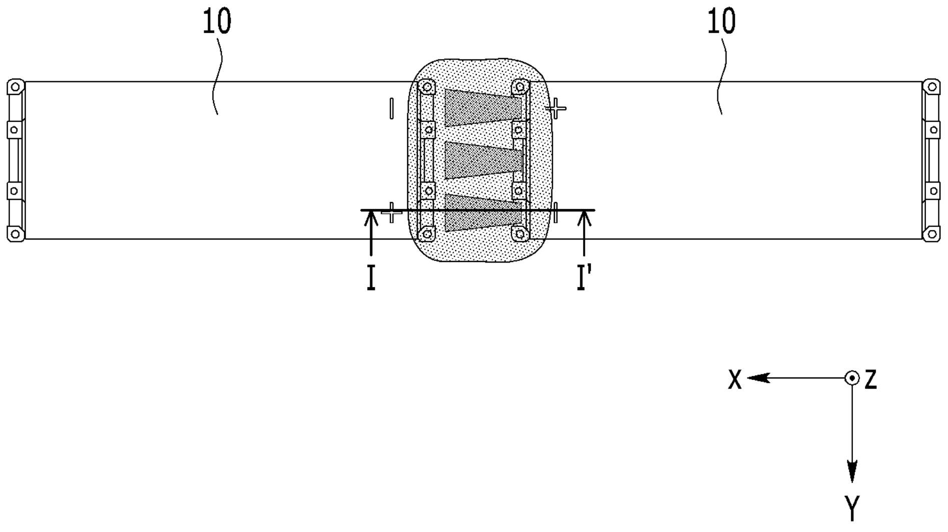
FIG. 2 is a view showing a state when the battery module ignites in the conventional battery pack in which the battery module of FIG. 1 is mounted.
Figure 3:
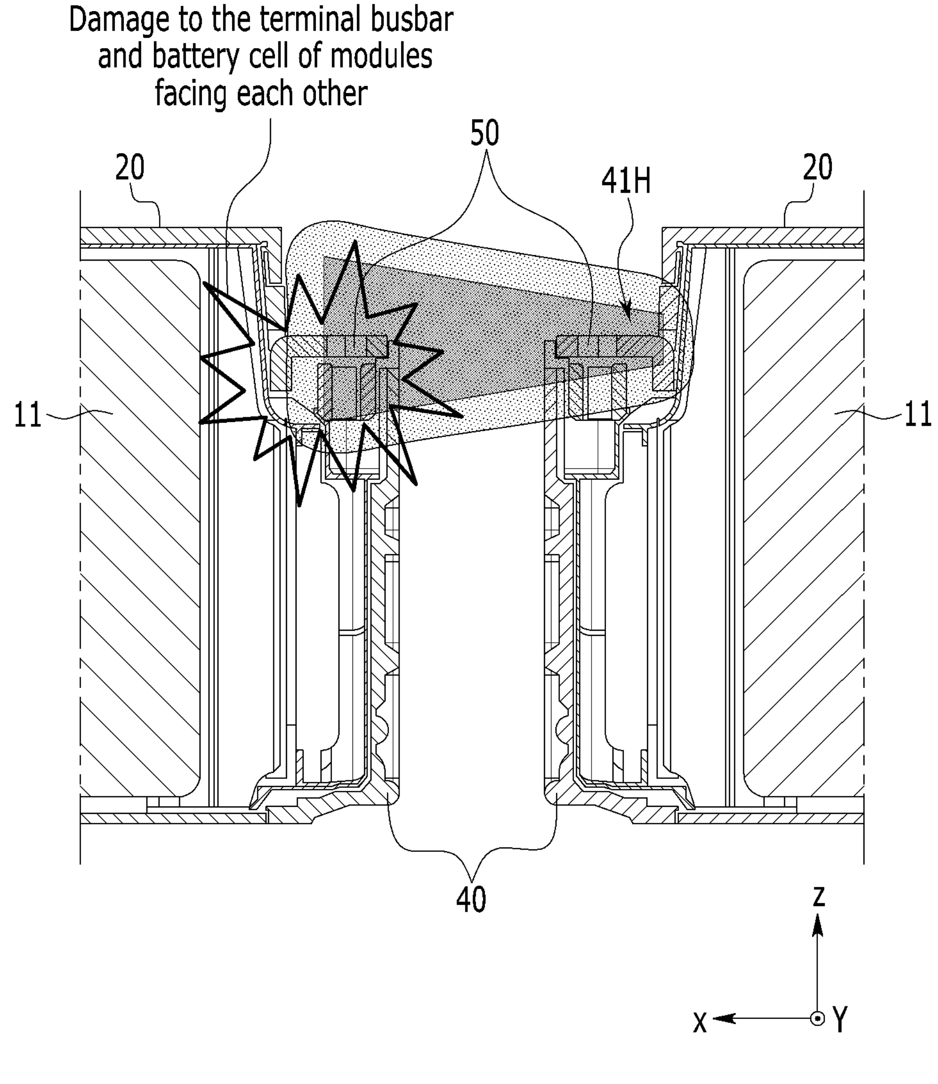
FIG. 3 is a cross-sectional view taken along the cutting line I-I' of FIG. 2.

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the description, when a portion is referred to as "including" or "comprising" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

Figure 4:
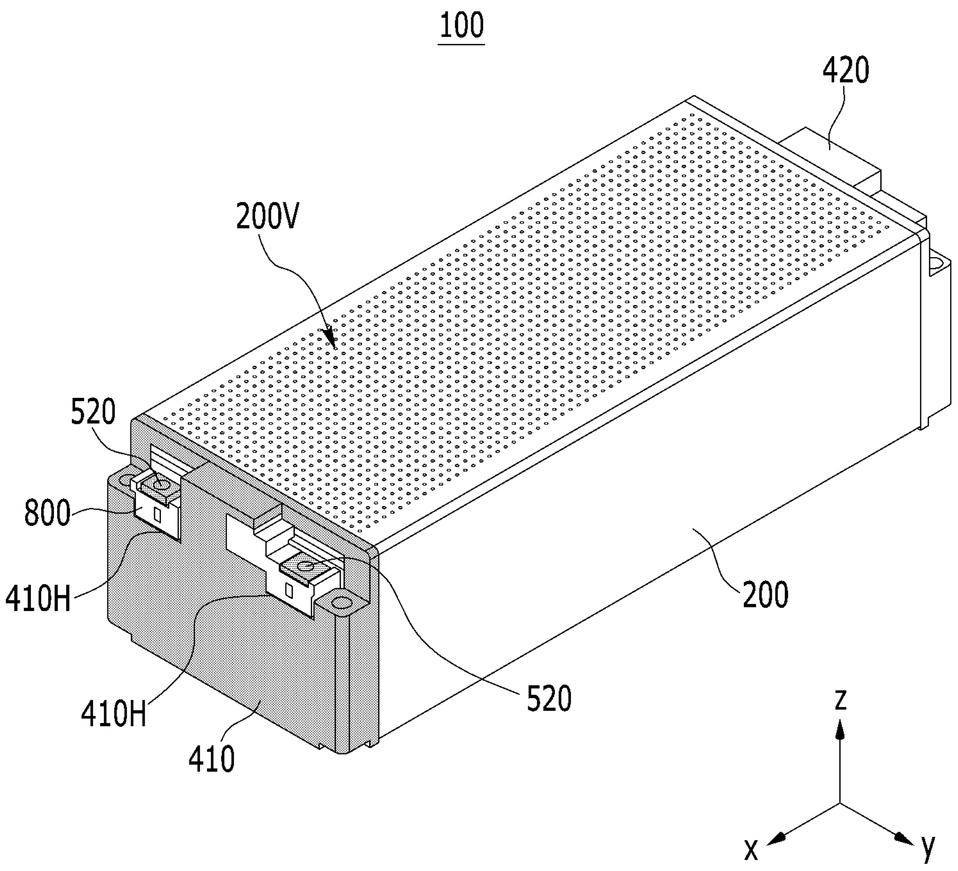
FIG. 4 is a perspective view showing a battery module according to an embodiment of the present disclosure.
Figure 5:
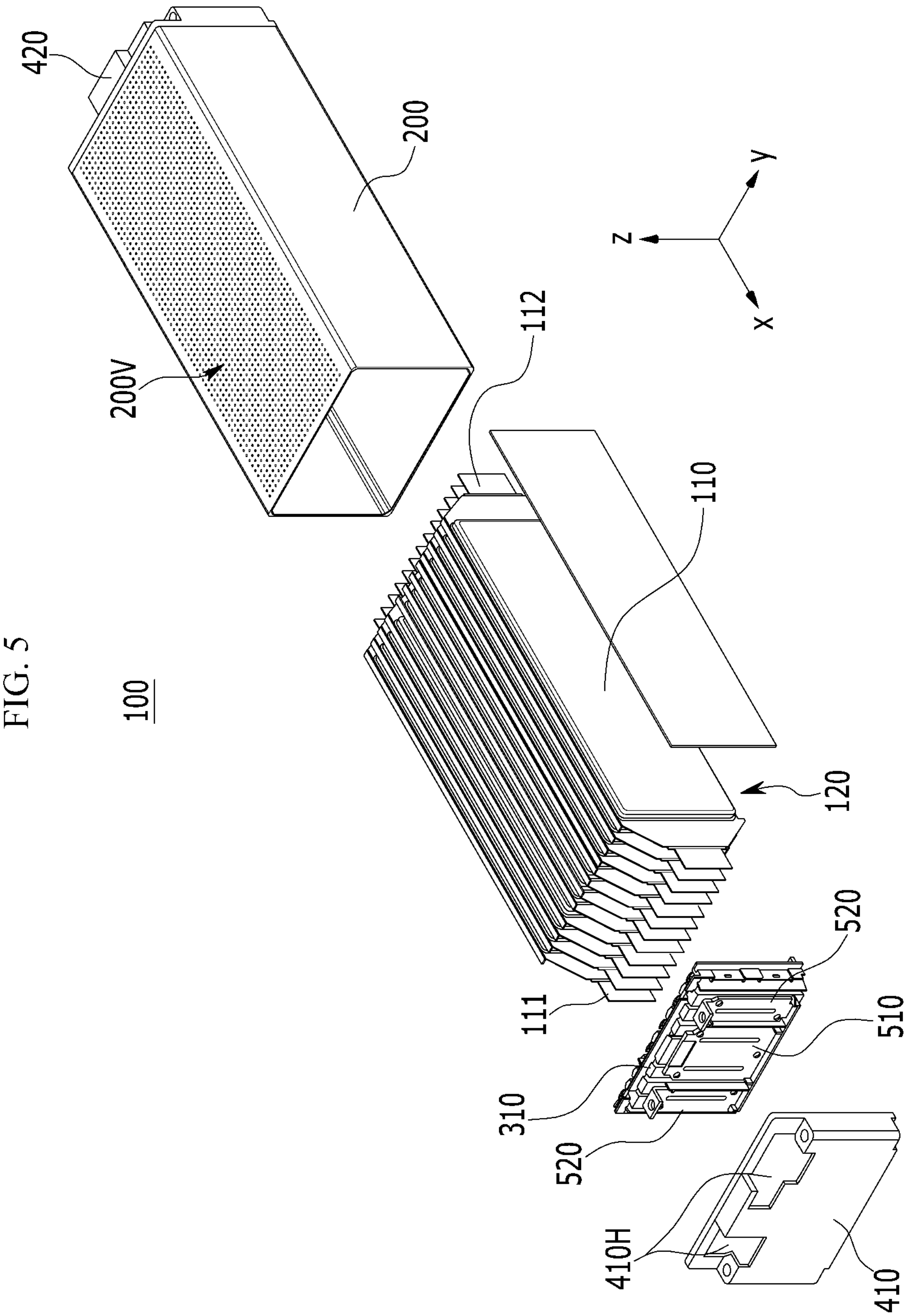
FIG. 5 is an exploded perspective view of the battery module of FIG. 4.
Figure 6:
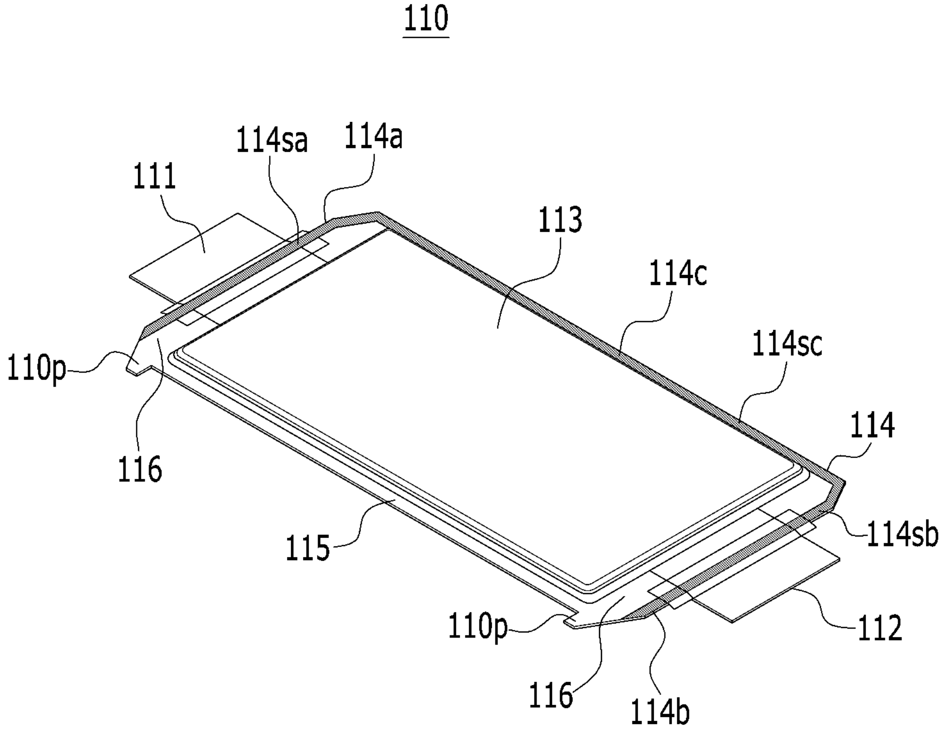
FIG. 6 is a perspective view of a battery cell included in the battery module of FIG. 5.

FIG. 4 is a perspective view showing a battery module according to an embodiment of the present disclosure. FIG. 5 is an exploded perspective view of the battery module of FIG. 4. FIG. 6 is a perspective view of a battery cell included in the battery module of FIG. 5.

Referring to FIGS. 4 to 6, a battery module 100 according to one embodiment of the present disclosure includes a battery cell stack 120 in which a plurality of battery cells 110 are stacked; and a module frame 200 for housing the battery cell stack 120.

First, referring to FIG. 6, the battery cell 110 is preferably a pouch-type battery cell. For example, the battery cell 110 according to the present embodiment has a structure in which two electrode leads 111 and 112 face each other and protrude from one end 114*a* and the other end 114*b* of the cell main body 113, respectively. More specifically, the electrode leads 111 and 112 are connected to an electrode assembly (not shown), and protrude from the electrode assembly (not shown) to the outside of the battery cell 110.

Meanwhile, the battery cell 110 can be manufactured by joining both end parts 114*a* and 114*b* of the cell case 114 and one side part 114*c* connecting them, in a state in which the electrode assembly (not shown) is housed in a cell case 114. In other words, the battery cell 110 according to the present embodiment has a total of three sealing parts 114*sa*, 114*sb* and 114*sc*, the sealing parts 114*sa*, 114*sb* and 114*sc* have a structure sealed by a method such as heat fusion, and the remaining other side part may be formed of a connection part 115. The cell case 114 may be formed of a laminated sheet containing a resin layer and a metal layer.

In addition, the connection part 115 may extend long along one edge of the battery cell 110, and a protrusion part 110*p* of the battery cell 110 called a bat-ear may be formed at an end part of the connection part 115. Further, while the cell case 114 is sealed with the protruding electrode leads 111 and 112 being interposed therebetween, a terrace part 116 may be formed between the electrode leads 111 and 112 and the cell main body 113. That is, the battery cell 110 includes a terrace part 116 formed to extend from the cell case 114 in a protruding direction of the electrode leads 111 and 112.

The battery cell 110 may be composed by a plurality of numbers, and the plurality of battery cells 110 may be stacked so as to be electrically connected to each other, thereby forming a battery cell stack 120. Referring to FIG. 5, the battery cells 110 can be stacked along the y-axis direction to form a battery cell stack 120. A first busbar frame 310 may be located on one surface of the battery cell stack 120 in the protruding direction (x-axis direction) of the electrode leads 111. Although it is not specifically shown in the figure, a second busbar frame may be located on the other surface of the battery cell stack 120 in the protruding direction (−x-axis direction) of the electrode leads 112. The battery cell stack 120 and the first busbar frame 310 may be housed together with the module frame 200. The module frame 200 can protect the battery cell stack 120 housed inside the module frame 200 and the electrical components connected thereto from external physical impacts.

Meanwhile, the module frame 200 can be opened in the protruding direction of the electrode leads 111 and 112 (x-axis direction, −x-axis direction), and a first end plate 410 and a second end plate 420 may be located on opened both sides of the module frame 200, respectively. The first end plate 410 can be joined to the module frame 200 while covering the first busbar frame 310, and the second end plate 420 can be joined to the module frame 200 while covering the second busbar frame (not shown). That is, a first busbar frame 310 may be located between the first end plate 410 and the battery cell stack 120, and a second busbar frame (not shown) may be located between the second end plate 420 and the battery cell stack 120. Further, an insulating cover 800 (see FIG. 4) for electrical insulation may be located between the first end plate 410 and the first busbar frame 310.

The first end plate 410 and the second end plate 420 are located so as to cover the one surface and the other surface of the battery cell stack 120, respectively. The first end plate 410 and the second end plate 420 can protect the first busbar frame 310 and various electrical components connected thereto from external impacts. For this purpose, they must have a predetermined strength and may include a metal such as aluminum. Further, the first end plate 410 and the second end plate 420 may be joined to a corresponding edge of the module frame 200 by a method such as welding, respectively.

The first busbar frame 310 can be located on one surface of the battery cell stack 120 to cover the battery cell stack 120 and at the same time, guide the connection between the battery cell stack 120 and external devices. Specifically, at least one of a busbar, a terminal busbar, and a module connector may be mounted onto the first busbar frame 310.

Particularly, at least one of a busbar, a terminal busbar, and a module connector may be mounted onto a surface opposite to the surface of the first busbar frame 310 facing the battery cell stack. As an example, FIG. 5 shows a state in which the busbar 510 and the terminal busbar 520 are mounted onto the first busbar frame 310.

The electrode lead 111 of the battery cells 110 is bent after passing through a slit formed in the first busbar frame 310 and can be joined to the busbar 510 or the terminal busbar 520. The battery cells 110 constituting the battery cell stack 120 may be connected in series or in parallel by the busbar 510 or the terminal busbar 520. Further, the battery cells 110 can be electrically connected to an external device or circuit through the terminal busbar 520 exposed to the outside of the battery module 100.

The first busbar frame 310 may include an electrically insulating material. The first busbar frame 310 restricts the busbar 510 or the terminal busbar 520 from making contact with the battery cells 110, except for the portion where the busbar 510 or the terminal busbar 520 is joined to the electrode leads 111, thereby preventing the occurrence of a short circuit.

Meanwhile, as described above, the second busbar frame may be located on the other surface of the battery cell stack 120, and at least one of the busbar, terminal busbar, and module connector may be mounted onto the second busbar frame. An electrode lead 112 can be joined to such a busbar.

An opening in which at least one of the terminal busbar and the module connector is exposed can be formed in the first end plate 410 according to the present embodiment. The opening may be a terminal busbar opening or a module connector opening. In one example, as shown in FIGS. 4 and 5, a terminal busbar opening 410H where the terminal busbar 520 is exposed can be formed in the first end plate 410. The terminal busbar 520 further includes an upwardly protruding portion as compared with the busbar 510. Such upwardly protruding portion may be exposed to the outside of the battery module 100 via the terminal busbar opening 410H. The terminal busbar 520 exposed via the terminal busbar opening 410H may be connected to another battery module or a battery disconnect unit (BDU) to form a high voltage (HV) connection.

Figure 7:
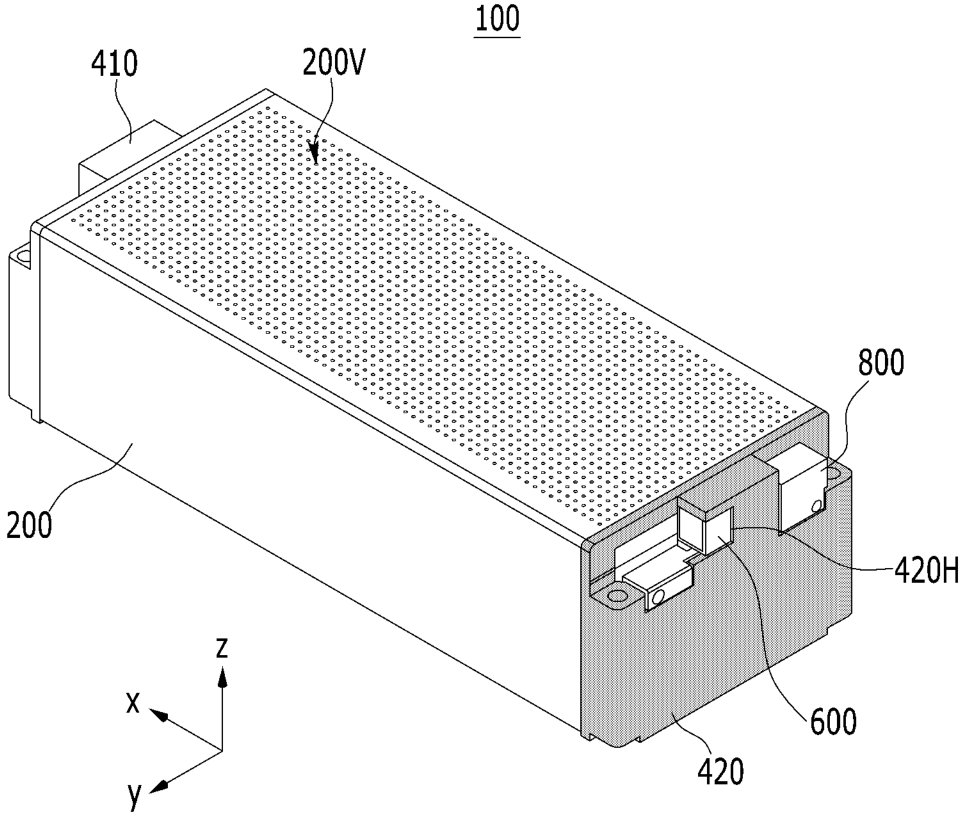
FIG. 7 is a perspective view showing the second end plate of the battery module of FIG. 4 at different angles so as to be seen from the front.

FIG. 7 is a perspective view showing the second end plate of the battery module of FIG. 4 at different angles so as to be seen from the front.

Referring to FIG. 7, as an example, a module connector opening 420H through which the module connector 600 is exposed may be formed in the second end plate 420. This means that the module connector 600 is mounted on the above-mentioned second busbar frame. The module connector 600 can be connected to a temperature sensor, a voltage measuring member, or the like provided inside the battery module 100. Such a module connector 600 is connected to an external BMS (battery management system) to form an LV (Low voltage) connection, and it performs a function of transmitting temperature information, voltage level and the like measured by the temperature sensor or the voltage measuring member to the external BMS.

The first end plate 410 and the second end plate 420 shown in FIGS. 4, 5 and 7 are exemplary structures. According to another embodiment of the present disclosure, a module connector is mounted on the first busbar frame 310 and a terminal busbar may be mounted on the second busbar frame. Thereby, a module connector opening may be formed in the first end plate, and a terminal busbar opening may be formed in the second end plate.

Next, a venting part according to an embodiment of the present disclosure will be described in detail with reference to FIGS. 8 and 9.

Figure 8:
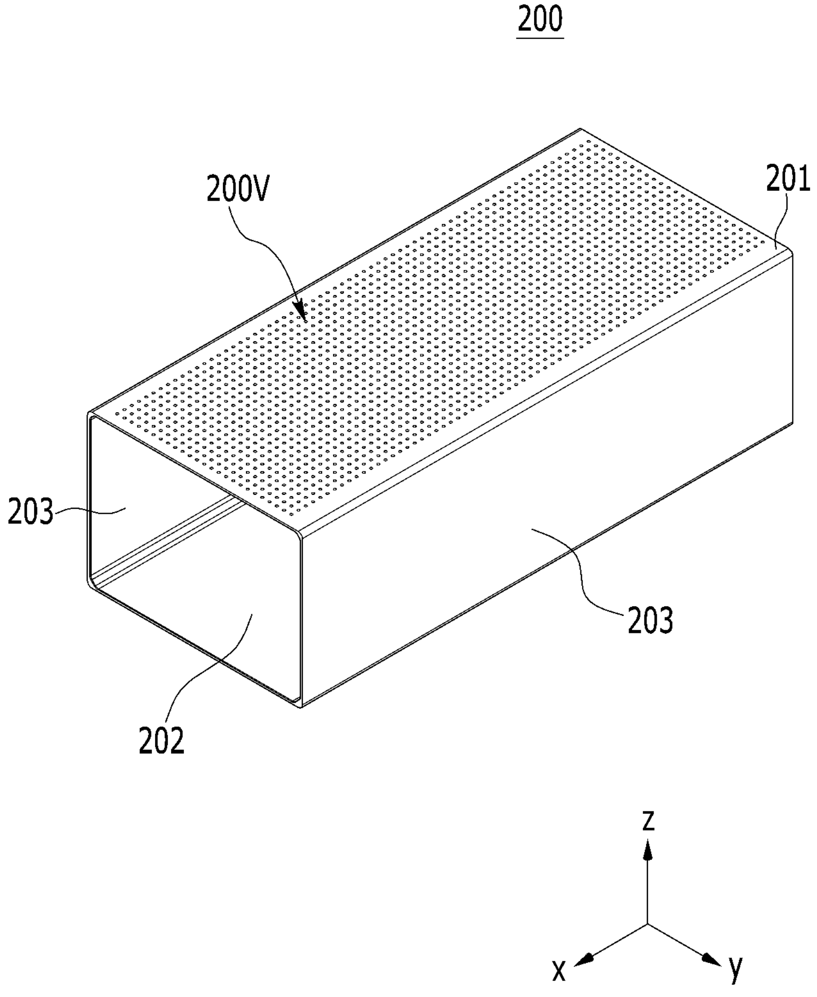
FIG. 8 is a perspective view showing a module frame included in the battery module of FIG. 4.

FIG. 8 is a perspective view showing a module frame included in the battery module of FIG. 4. FIG. 9 is a perspective view showing a venting part formed in the module frame of FIG. 8.

Referring to FIGS. 4, 5, 8 and 9, a venting part 200V is formed on at least one surface of the module frame 200 according to the present embodiment.

The module frame 200 may include a ceiling part 201, a bottom part 202, and both side surface parts 203. Here, the ceiling part 201 means a surface in the z-axis direction that covers the upper surface of the battery cell stack 120, the bottom part 202 means a surface in the −z-axis direction that covers the lower surface of the battery cell stack 120, and the both side surface parts 203 refer to surfaces in the y-axis and −y-axis directions each covering both side surfaces of the battery cell stack 120.

In FIGS. 4, 5, and 8, as an example, it is shown that the venting part 200V is formed on the ceiling part 201 of the module frame 200, but at least one of the ceiling part 201, the bottom part 202, and both side surface parts 203 may include a venting portion 200V.

Such a venting part 200V includes a plurality of layers 200L, and micropores 210H and 220H are formed in each of the plurality of layers 200L. That is, in the present embodiment, the venting part 200V may refer to one surface of the module frame 200 including the plurality of layers 200L in which the micropores 210H and 220H are formed.

More specifically, the plurality of layers 200L may include a first layer 210 and a second layer 220, and micropores 210H and 220H may be formed in each of the first layer 210 and the second layer 220. For convenience of explanation, only two layers of the first layer 210 and the second layer 220 are shown, but additional layers such as a third layer and a fourth layer may be included as needed. Meanwhile, the number of micropores 210H and 220H formed in each of the plurality of layers 200L is not particularly limited, and can vary depending on the size and density of the micropores 210H and 220H described later.

The plurality of layers 200L may be a metal sheet in which micropores 210H and 220H are formed, and the plurality of layers 200L may be press-fitted at high temperature and high pressure to form a venting part 200V.

As described above, when a high-temperature gas or flame is generated from the battery cell 110, a high-temperature gas or flame is immediately discharged through the terminal busbar opening 410H or the module connector opening 420H, which may damage adjacent battery modules. In particular, if the flame is discharged directly, the flame may also spread to adjacent battery modules, which may lead to a chain ignition and explosion.

Thus, micropores 210H and 220H are formed in the venting part 200V according to the present embodiment, which makes it possible to prevent the high-temperature flame from being directly discharged while the high-temperature gas is rapidly discharged to the outside. That is, the plurality of micropores 210H and 220H can play a role like a kind of mesh screen and suppress the flame from being discharged to the outside. Further, since the micropores 210H and 220H having a fine size are formed rather than a simple through hole, the effect of increasing the heat transfer area of the module frame 200 can be obtained. That is, the amount of gas discharged can be increased, and the rate of temperature rise in the battery module 100 due to heat dissipation to the outside of the battery module 100 can be reduced.

Further, in the venting part 200V according to the present embodiment, the first layer 210 and the second layer 220 in which the micropores 210H and 220H are formed are composed of a plurality of layers rather than a single layer. Each time the flame generated inside passes through each of the plurality of layers 200L, the flame intensity may be lowered by heat dissipation. That is, the venting part 200V according to the present embodiment can have a flame extinguishing function that effectively suppresses the flame without deteriorating the gas discharge function.

Further, as the plurality of layers 200L are arranged apart from each other at a predetermined interval, it is possible to reduce the frequency at which sparks inside the battery module 100 are directly exposed to the outside. Therefore, it is possible to prevent the heat and flame between the battery modules 100 from being transferred in the battery pack or device.

Further, since it is composed of a plurality of layers rather than a single layer, the path through which the flame is discharged can be set more complicatedly. As the flame discharge path becomes complicated, it is possible to effectively block the flame with a strong straight advancing tendency, and the flame intensity may be lowered every time it passes through each of the plurality of layers 200L. That is, the venting part 200V according to the present embodiment can have a further enhanced flame extinguishing function.

Figure 9:
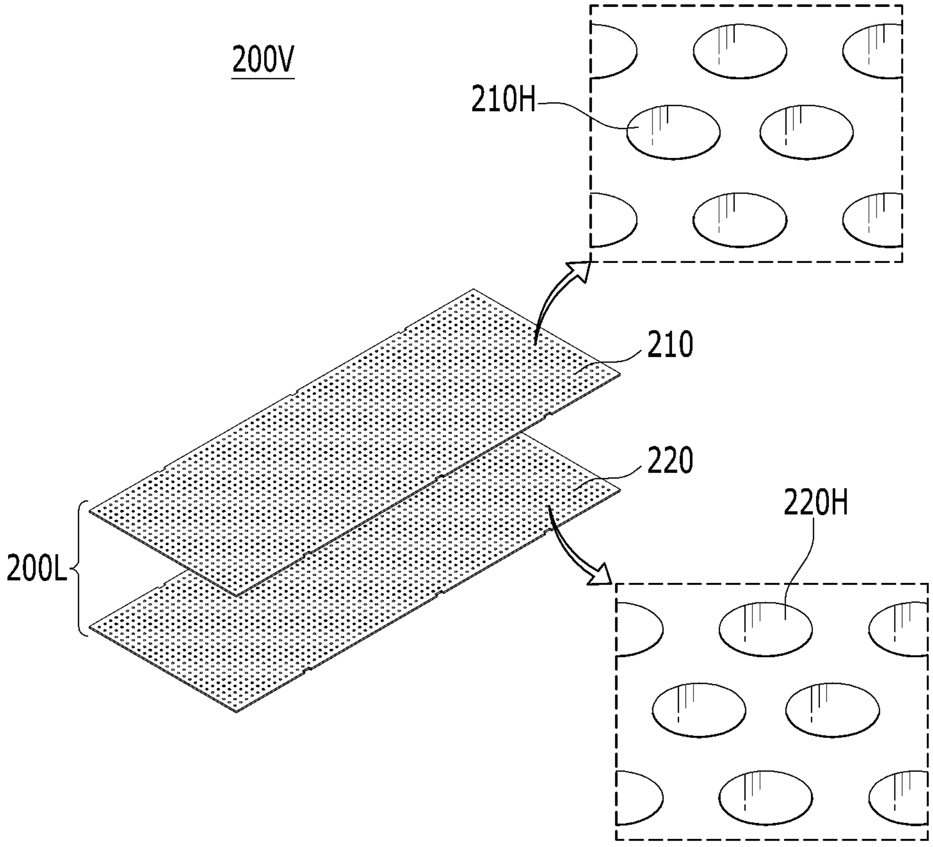
FIG. 9 is a perspective view showing a venting part formed in the module frame of FIG. 8.

Meanwhile, in FIG. 9, the shape of the micropores 210H and 220H is shown as a circle shape, but the shape is no particularly limited, and holes such as an elliptical shape and a polygonal shape are also possible.

Next, a venting part according to modified embodiments of the present disclosure will be described.

Figure 10:
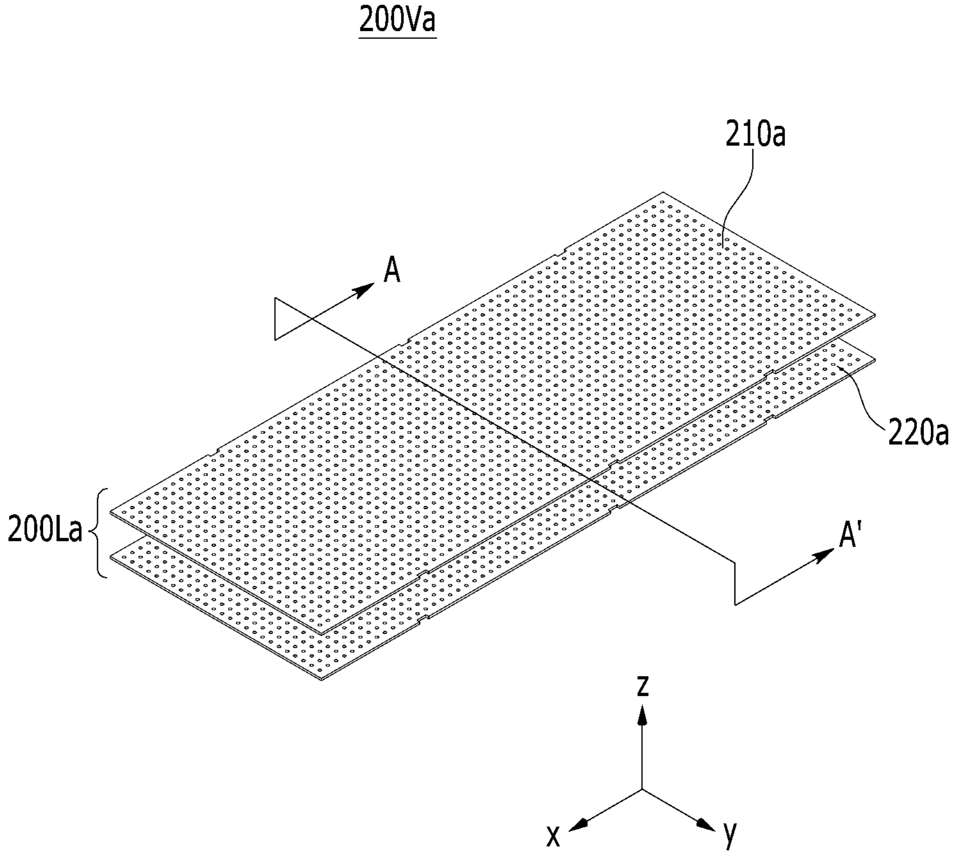
FIG. 10 is a perspective view showing a venting part according to a modified embodiment of the present disclosure.
Figure 11:
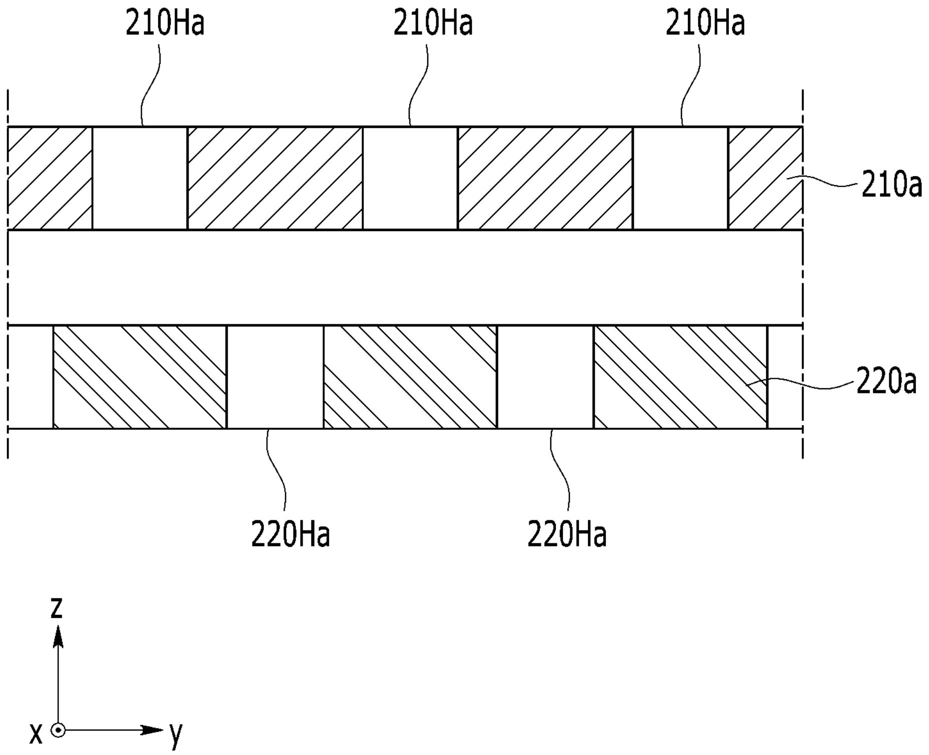
FIG. 11 is a cross-sectional view showing a cross-section taken along the cutting line A-A' of FIG. 10.

FIG. 10 is a perspective view showing a venting part according to a modified embodiment of the present disclosure. FIG. 11 is a cross-sectional view showing a cross-section taken along the cutting line A-A' of FIG. 10.

Referring to FIGS. 10 and 11, the venting part 200Va according to a modified embodiment of the present disclosure includes a plurality of stacked layers 200La, and micropores 210Ha and 220Ha are formed in each of the plurality of layers 200La, wherein the micropores 210Ha and 220Ha of each layer may be arranged so as to be displaced from each other.

Specifically, the plurality of layers 200La may include a first layer 210*a* and a second layer 220*a*. At this time, in a state in which the first layer 210*a* and the second layer 220*a* are stacked, the micropores 210Ha formed in the first layer 210*a* and the micropores 220Ha formed in the second layer 220*a* may be arranged so as to be displaced from each other. As shown FIGS. 10 and 11, the position of the micropores 210Ha formed in the first layer 210*a* and the position of the micropores 220Ha formed in the second layer 220*a* with respect to the direction in which the plurality of layers 200La are stacked (z-axis direction) do not correspond to each other, but may be intentionally displaced.

In this manner, by setting the micropores formed in each layer to be displaced from each other based on the state in which the layers are stacked, the path through which the flame is discharged can be set more complicatedly. In particular, considering the nature of flames or sparks that have a strong straight advancing tendency and burst out instantaneously, the path formed by the micropores is implemented so as not to be in a straight line, an attempt was made to effectively regulate the discharge of flames instead of having an effect on gas discharge. The venting part 200Va according to the present embodiment can have a further enhanced flame extinguishing function.

Figure 12:
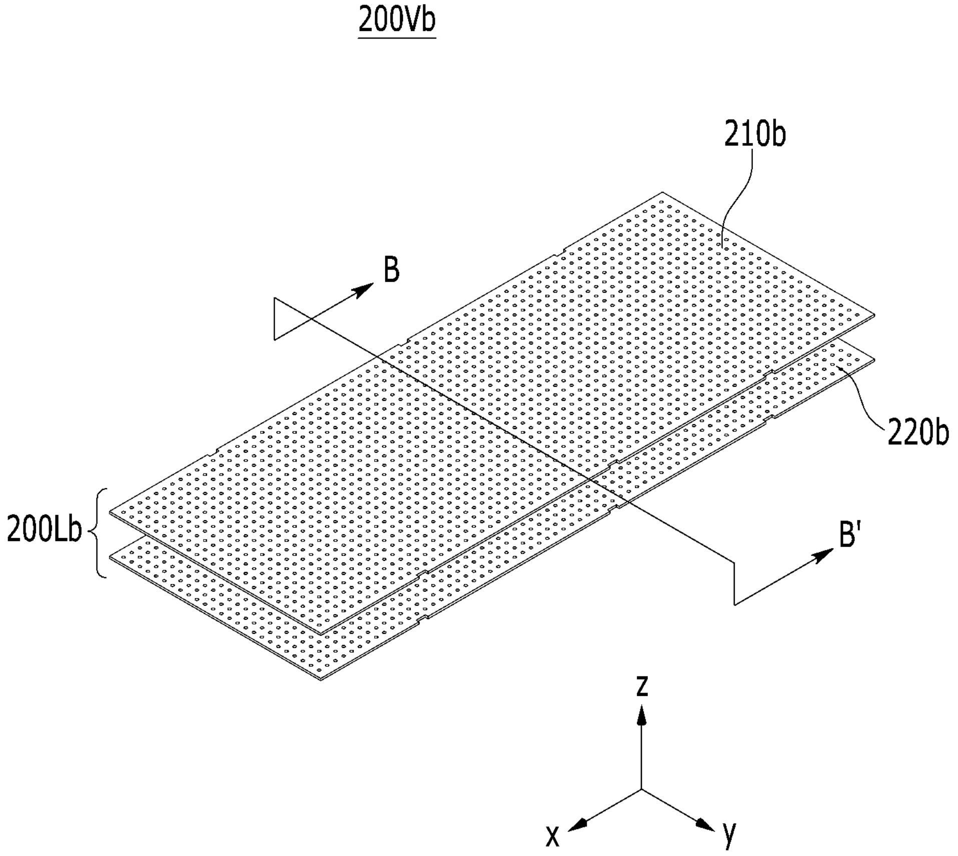
FIG. 12 is a perspective view showing a venting part according to a modified embodiment of the present disclosure.
Figure 13:
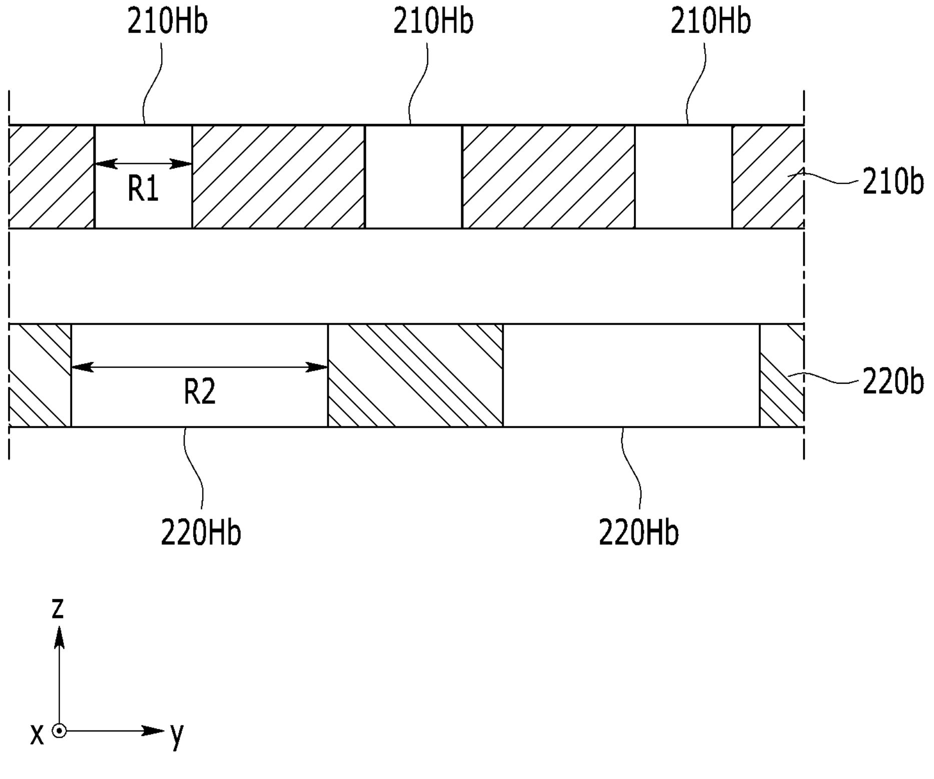
FIG. 13 is a cross-sectional view showing a cross-section taken along the cutting line B-B' of FIG. 12.

FIG. 12 is a perspective view showing a venting part according to a modified embodiment of the present disclosure. FIG. 13 is a cross-sectional view showing a cross-section taken along the cutting line B-B' of FIG. 12.

Referring to FIGS. 12 and 13, the venting part 200Vb according to a modified embodiment of the present invention includes a plurality of stacked layers 200Lb, and micropores 210Hb and 220Hb are formed in each of the plurality of layers 200Lb. At this time, the sizes of the micropores 210Hb and 220Hb of each layer may be different from each other. The sizes of the micropores 210Hb and 220Hb being different mean that the extents of the areas of the perforated portions of the micropores 210Hb and 220Hb are different.

Specifically, the plurality of layers 200Lb may include a first layer 210*b* and a second layer 220*b*, and the size of the micropores 210Hb formed in the first layer 210*b* and the size of the micropores 220Hb formed in the second layer 220*b* may be different from each other. As an example, the micropores 210Hb formed in the first layer 210*b* and the micropores 220Hb formed in the second layer 220*b* may be circular micropores as in the micropores 210H and 220H of FIG. 9. The diameter R1 of the micropores 210Hb formed in the first layer 210*b* may be different from the diameter R2 of the micropores 220Hb formed in the second layer 220*b*. Although the diameter R1 of the micropores 210Hb formed in the first layer 210*b* is smaller than the diameter R2 of the micropores 220Hb formed in the second layer 220*b*, in another embodiment, the diameter R1 of the micropores 210Hb formed in the first layer 210*b* may be larger than the diameter R2 of the micropores 220Hb formed in the second layer 220*b*.

In this manner, by setting the micropores formed in each layer to have different sizes, the path through which the flame can be set more complicatedly. As the flame discharge path becomes more complex, it is possible to effectively block a flame with a strong straight advancing tendency, the venting part 200Vb according to the present embodiment can have a further enhanced flame extinguishing function.

Figure 14:
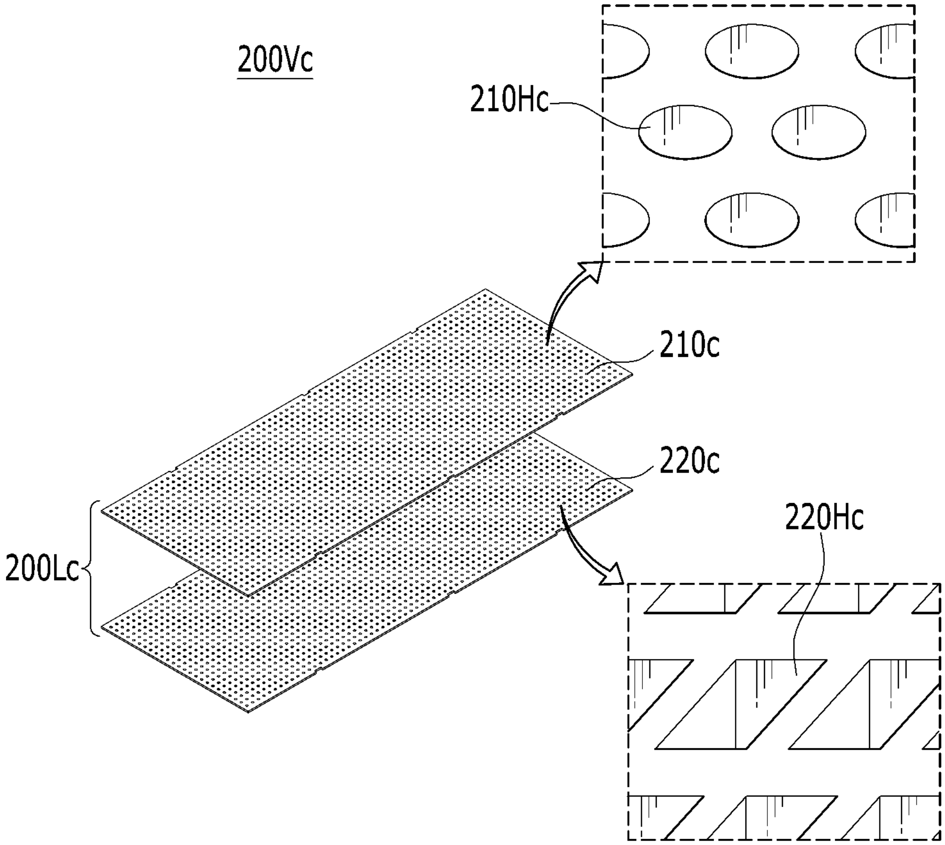
FIG. 14 is a perspective view showing a venting part according to a modified embodiment of the present disclosure.

FIG. 14 is a perspective view showing a venting part according to a modified embodiment of the present disclosure.

Referring to FIG. 14, the venting part 200Vc according to a modified embodiment of the present disclosure includes a plurality of stacked layers 200Lc, and micropores 210Hc and 220Hc are formed in each of the plurality of layers 200Lc. At this time, the micropores 210Hc and 220Hc of each layer may have different shapes from each other. As described above, the micropores according to the present embodiment may have such as a shape such as a circular shape, an elliptical shape, or a polygonal shape without limitation, and the shape of the micropores may be different for each layer.

Specifically, the plurality of layers 200Lc may include a first layer 210*c* and a second layer 220*c*, and the micropores 210Hc formed in the first layer 210*c* and the micropores 220Hc formed in the second layer 220*c* may have different shapes. As an example, the micropores 210Hc formed in the first layer 210*c* may be circular, and the micropores 220Hc formed in the second layer 220*c* may be rectangular.

In this manner, by setting the micropores formed in each layer to have different shapes, the path through which the flame is discharged can be set more complicatedly. As the flame discharge path becomes complicated, it is possible to effectively block a flame with a strong straight advancing tendency. The venting part 200Vc according to the present embodiment may have a further increased flame-extinguishing function.

Figure 15:
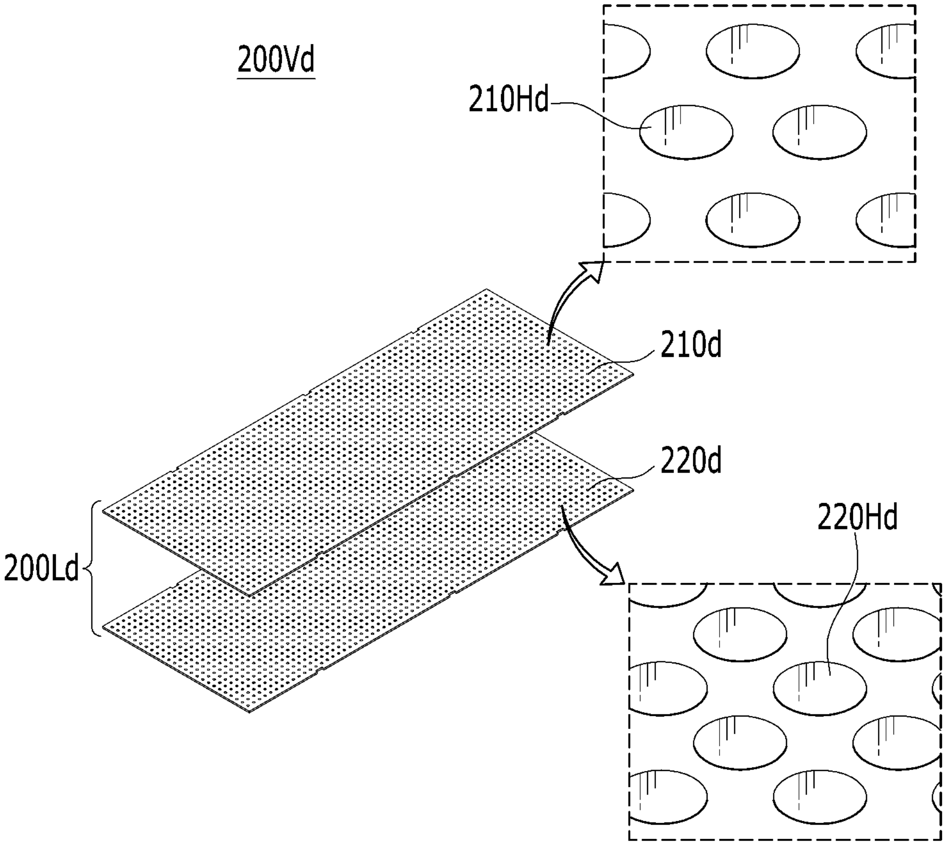
FIG. 15 is a perspective view showing a venting part according to a modified embodiment of the present disclosure.

FIG. 15 is a perspective view showing a venting part according to a modified embodiment of the present disclosure.

Referring to FIG. 15, the venting part 200Vd according to a modified embodiment of the present disclosure includes a plurality of stacked layers 200Ld, wherein micropores 210Hd and 220Hd are formed in each of the plurality of layers 200Ld. At this time, the micropores 210Hd and 220Hd of each layer may have different densities from each other. Here, the density is a value indicating the number of micropores per unit area, and may be a value obtained by dividing the number of micropores formed in one layer by the area of the one layer.

Specifically, the plurality of layers 200Ld may include a first layer 210*d* and a second layer 220*d*, and the density of the micropores 210Hd formed in the first layer 210*d* and the density of the micropores 220Hd formed in the second layer 220*d* may be different from each other. As an example, when the first layer 210*d* is located outside the second layer 220*d* in the battery module as shown in FIG. 15, the density of the micropores 210Hd formed in the first layer 210*d* may be lower than that of the micropores 220Hd formed in the second layer 220*d*. In another embodiment, the density of the micropores 210Hd formed in the first layer 210*d* may be higher than that of the micropores 220Hd formed in the second layer 220*d*.

By setting the density of micropores formed in each layer to be different from each other in this way, the path through which the flame is discharged can be set more complicatedly. As the flame discharge path is more complicated, it is possible to effectively block a flame with a strong straight advancing tendency. The venting part 200Vd according to the present embodiment may have a further increased flame-extinguishing function.

Figure 16:
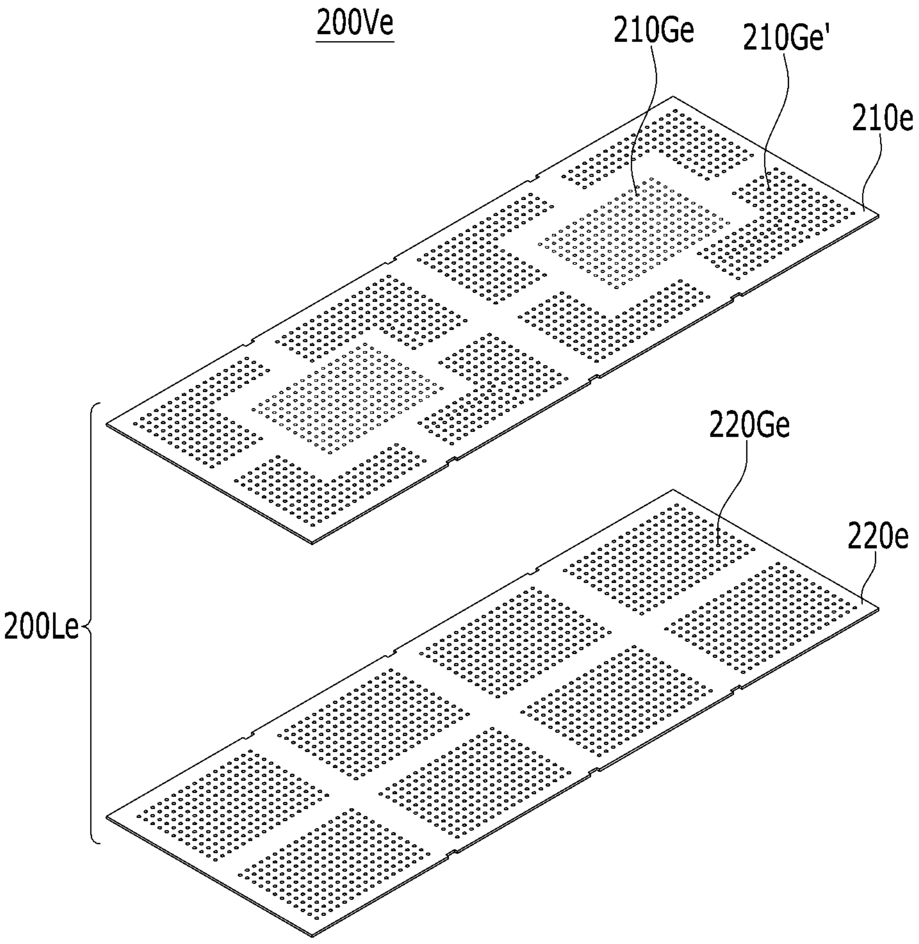
FIG. 16 is a perspective view showing a venting part according to a modified embodiment of the present disclosure.

FIG. 16 is a perspective view showing a venting part according to a modified embodiment of the present disclosure.

Referring to FIG. 16, the venting part 200Ve according to a modified embodiment of the present disclosure includes a plurality of stacked layers 200Le, wherein micropores are formed in each of the plurality of layers 200Le. At this time, the micropores of each layer may be gathered to form micropore groups 210Ge, 210Ge', and 220Ge.

Specifically, the plurality of layers 200Le may include a first layer 210*e* and a second layer 220*e*, wherein an arrangement form formed by the micropore groups 210Ge and 210Ge' of the first layer 210*e* may be different from an arrangement form formed by the micropore group 220Ge of the second layer 220*e*. As an example, the first layer 210*e* may have a form in which a rectangular micropore group 210Ge and an atypical micropore group 210Ge' are combined, but the second layer 220*e* may be in the form of combining only the rectangular micropore group 220Ge. However, this is an exemplary structure, and various arrangement forms are possible when only the arrangement form of the micropore group between the layers is different.

In this manner, by setting the arrangement form of the micropore group formed by the micropores formed in each layer to be different from each other, the path through which the flame is discharged can be set more complicatedly. As the flame discharge path becomes complicated, it is possible to effectively block a flame with a strong straight advancing tendency. The venting part 200Ve according to the present embodiment may have a further enhanced flame extinguishing function.

Next, a module frame according to embodiments of the present disclosure will be described in detail with reference to FIGS. 17 and 18.

Figure 17:
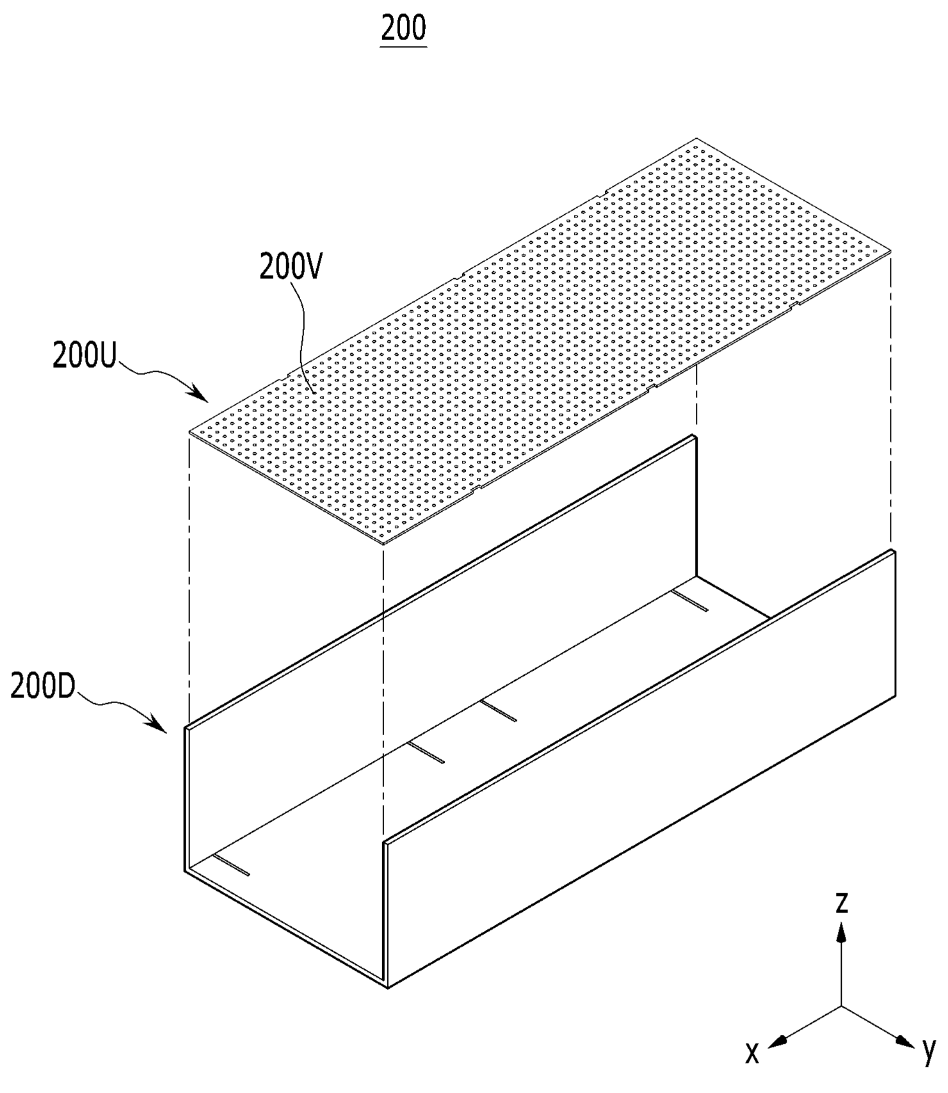
FIG. 17 is a perspective view showing a module frame according to an embodiment of the present disclosure.

First, FIG. 17 is a perspective view showing a module frame according to an embodiment of the present disclosure.

Referring to FIG. 17, the module frame 200 according to an embodiment of the present disclosure may include an upper frame 200U and a lower frame 200D. A plurality of layers in which micropores are formed can be press-fitted at high temperature and high pressure to manufacture a plate-shaped upper frame 200U in which a venting part 200V is formed. Meanwhile, the lower frame 200D may be a U-shaped frame having a U-shaped cross-section cut along the yz plane.

The upper frame 200U and the lower frame 200D are joined by a method in which the edges corresponding to each other are welded, so that the module frame 200 in which the venting part 200V is formed in the ceiling part 201 as shown in FIG. 8 can be manufactured.

Figure 18:
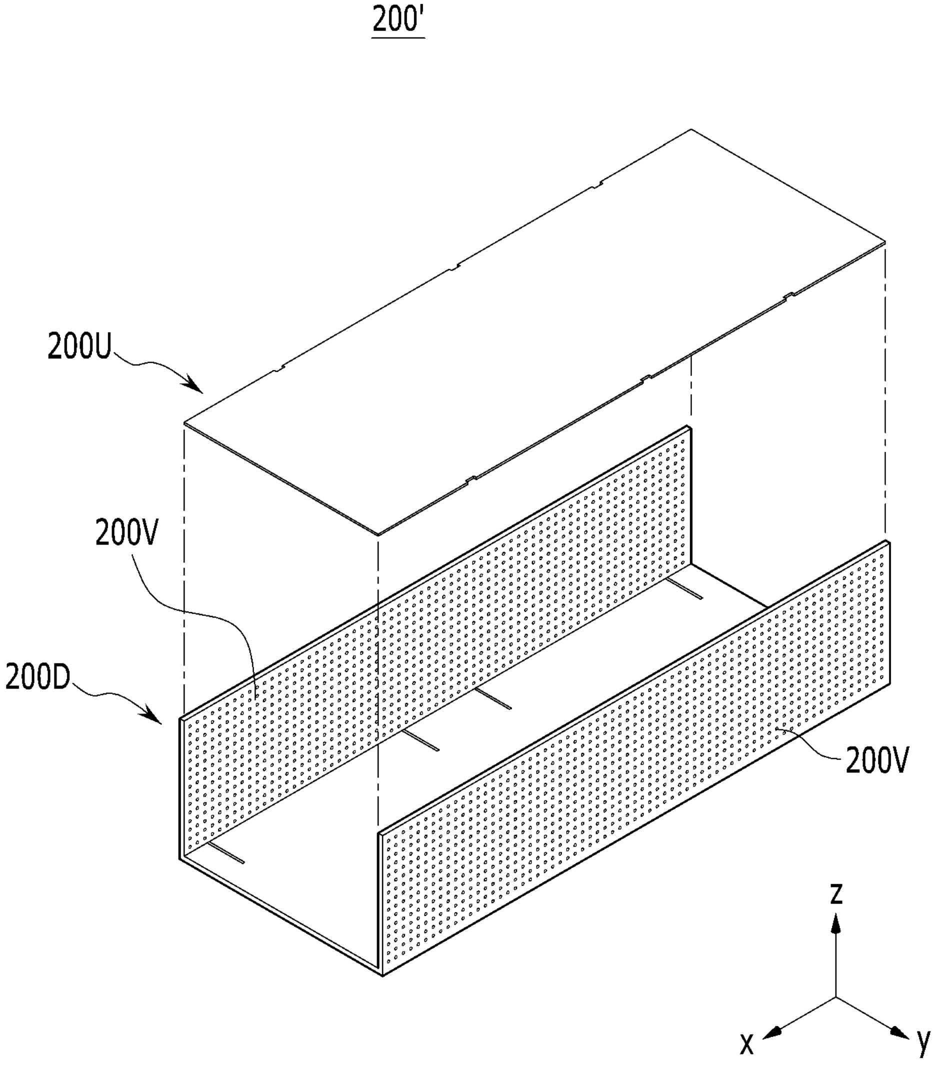
FIG. 18 is a perspective view showing a module frame according to another embodiment of the present disclosure.

FIG. 18 is a perspective view showing a module frame according to another embodiment of the present disclosure.

Referring to FIG. 18, a module frame 200' according to another embodiment of the present disclosure may include an upper frame 200U and a lower frame 200D. The upper frame 200U may be a member made of a metal plate. Meanwhile, the venting part 200V is formed in two areas of the metal plates, and these metal plates are bent to make a U-shaped structure. Thereby, the lower frame 200D can be manufactured.

The upper frame (200U) and the lower frame (200D) are joined by a method in which the edges corresponding to each other are welded, so that a module frame 200' in which venting parts 200V are formed on both side surfaces can be manufactured.

Although it is not specifically illustrated, the module frame in which the venting part 200V is formed at the bottom part can also be manufactured in a similar manner.

The terms representing directions such as the front side, the rear side, the left side, the right side, the upper side, and the lower side have been used in embodiments of the present disclosure, but the terms used are provided simply for convenience of description and may become different according to the position of an object, the position of an observer, or the like.

The one or more battery modules according to embodiments of the present disclosure described above can be mounted together with various control and protection systems such as a battery management system (BMS) and a cooling system to form a battery pack.

The battery module or the battery pack can be applied to various devices. For example, it can be applied to vehicle means such as an electric bike, an electric vehicle, and a hybrid electric vehicle, and may be applied to various devices capable of using a secondary battery, without being limited thereto.

The present disclosure has been described in detail with reference to exemplary embodiments thereof, but the scope of the present disclosure is not limited thereto and modifications and improvements made by those skilled in the part by using the basic concept of the present disclosure, which are defined in the following claims, also belong to the scope of the present disclosure.

DESCRIPTION OF REFERENCE NUMERALS

100: battery module
120: battery cell stack

200: module frame
200V: venting part
200L: plural layers
210H, 220H: micropores

The invention claimed is:

1. A battery module comprising:

a battery cell stack in which a plurality of battery cells are stacked; and a module frame for housing the battery cell stack, wherein a vent is formed on at least one surface of the module frame, wherein the vent comprises a plurality of stacked layers, wherein micropores are formed in each of the plurality of layers, each micropore extending from a top surface of each layer to a bottom surface of each layer, wherein the plurality of layers comprises a first layer and a second layer stacked in a first direction to define a gas discharge path from the second layer to the first layer, and wherein the micropores formed in the first layer and the micropores formed in the second layer are offset from each other in a second direction.

2. The battery module according to claim 1, wherein:

a size of the micropores formed in the first layer and a size of the micropores formed in the second layer are different from each other.

3. The battery module according to claim 2, wherein:

wherein a diameter of the micropores formed in the first layer is different from a diameter of the micropores formed in the second layer.

4. The battery module according to claim 1, wherein:

the micropores formed in the first layer and the micropores formed in the second layer are different from each other.

5. The battery module according to claim 1, wherein:

a density of the micropores formed in the first layer is different than a density of the micropores formed in the second layer.

6. The battery module according to claim 1, wherein:

a micropore group in which the micropores are gathered is formed in each of the first layer and the second layer, and an arrangement form formed by the micropore group of the first layer is different from an arrangement form formed by the micropore group of the second layer.

7. The battery module according to claim 1, wherein:

the plurality of layers are metal sheets.

8. The battery module according to claim 1, wherein:

the plurality of layers are press-fitted at high temperature and high pressure to form the vent.

9. The battery module according to claim 1, wherein:

the module frame comprises a ceiling, a bottom and side surfaces covering an upper surface, a lower surface and side surfaces of the battery cell stack, respectively, and at least one of the ceiling, the bottom and the side surfaces comprises the vent.

10. The battery module according to claim 1, further comprising a first end plate and a second end plate that cover a front surface and a rear surface of the battery cell stack, respectively, and at least one of a terminal busbar opening through which a terminal busbar is exposed and a module connector opening through which a module connector is exposed is formed in at least one of the first end plate and the second end plate.

11. The battery module according to claim 1, wherein:

the plurality of layers are arranged apart from each other at a predetermined interval.

12. The battery module according to claim 1, wherein:

the module frame includes an upper frame and a lower frame, and the upper frame and the lower frame are joined by a method in which edges corresponding to each other are welded.

13. A battery pack comprising the battery module according to claim 1.

14. The battery module according to claim 1, wherein the micropores formed in the first layer have a different shape than the micropores formed in the second layer.

15. The battery module according to claim 1, wherein the micropores formed in the first layer are formed in a first pattern and the micropores formed in the second layer are formed in a second pattern different than the first pattern.

* * * * *